United States Patent [19]

Russell et al.

[11] Patent Number: 5,450,525
[45] Date of Patent: Sep. 12, 1995

[54] VEHICLE ACCESSORY CONTROL WITH MANUAL AND VOICE RESPONSE

[76] Inventors: Donald P. Russell, 46109 Forestwood, Plymouth, Mich. 48170; Paul E. Duffy, 4874 Cole Blvd., Ypsilanti, Mich. 48197

[21] Appl. No.: 975,047

[22] Filed: Nov. 12, 1992

[51] Int. Cl.6 .............................................. G10L 9/00
[52] U.S. Cl. ................................................... 395/2.84
[58] Field of Search ................................ 381/41–45; 395/2.79, 2.84, 2.6; 379/389, 420; 455/74, 79, 92

[56] References Cited

U.S. PATENT DOCUMENTS

| | | | |
|---|---|---|---|
| 4,401,852 | 8/1983 | Noso et al. | 179/1 VC |
| 4,426,733 | 1/1984 | Brenig | 455/79 |
| 4,506,377 | 3/1985 | Kishi et al. | 381/41 |
| 4,506,378 | 3/1985 | Noso et al. | 395/2.84 |
| 4,528,687 | 7/1985 | Noso et al. | 395/2.84 |
| 4,532,648 | 7/1985 | Noso et al. | 381/41 |
| 4,558,459 | 12/1985 | Noso et al. | 381/43 |
| 4,797,924 | 1/1989 | Schnars et al. | 381/43 |
| 4,827,520 | 5/1989 | Zeinstra | 381/43 |
| 4,870,686 | 9/1989 | Gerson et al. | 381/43 |
| 4,959,850 | 9/1990 | Marui | 379/58 |
| 5,007,081 | 4/1991 | Schmuckal et al. | 379/354 |
| 5,008,954 | 4/1991 | Oppendahl | 455/79 |
| 5,095,503 | 3/1992 | Kowalski | 579/59 |
| 5,148,471 | 9/1992 | Metroka et al. | 379/58 |
| 5,222,121 | 6/1993 | Shimada | 395/2.84 |
| 5,230,089 | 7/1993 | Kindinger et al. | 455/79 |
| 5,247,705 | 9/1993 | Attig et al. | 455/74 |
| 5,263,181 | 11/1993 | Reed | 455/152.1 |

*Primary Examiner*—Allen R. MacDonald
*Assistant Examiner*—Michelle Doerrler
*Attorney, Agent, or Firm*—Inger H. Eckert; Roger L. May

[57] ABSTRACT

A voice controlled vehicle accessory system is responsive to voice commands and/or manual commands, wherein the manual commands are entered via a single pushbutton having multiple functions depending upon the instantaneous state of a system controller. The present invention provides an accessory control which avoids false activation of the system by the voice recognition unit while improving accessability of the accessory to a user by providing manual control.

9 Claims, 3 Drawing Sheets

VEHICLE ACCESSORY CONTROL WITH MANUAL AND VOICE RESPONSE

CROSS REFERENCE TO RELATED APPLICATION

The present application is related to application Ser. No. 07/976,743, entitled "Integrated Microphone/Pushbutton Housing for Voice Activated Cellular Telephone", commonly assigned and filed concurrently herewith, which is incorporated by reference.

BACKGROUND OF THE INVENTION

The present invention relates in general to the control of vehicle accessory systems and more specifically to an accessory control responsive to voice inputs from a voice recognition unit and manual inputs from a manually activated switch.

Voice recognition has been and continues to be developed to provide input to electronically controlled systems in response to spoken commands. Voice responsive systems are useful in automotive vehicles to control vehicle accessories with minimal effort, minimal errors, and maximum convenience. As used herein, vehicle accessory means any system controlled by an occupant of a vehicle such as a cellular phone, an audio entertainment system, a climate control system, a vehicle lighting system, a windshield wiper system, a window defrost system, or a vehicle speed control system, for example.

A voice recognition unit receives a speech input by way of a microphone in the form of an utterance which is compared to preprogrammed and stored utterances to determine a match that identifies an appropriate command. The reliability of matching an utterance with the intended command is related to ambient background noise contained in an utterance picked up by the microphone and to the size of a corresponding command set with which an utterance is to be compared. In a typical voice recognition unit, the degree of similarity between a received utterance and the preprogrammed utterances is designed to provide optimum voice recognition performance without errors. However, it is known to require an even closer match in certain comparisons to avoid a problem known as "falsing", which is unintended actuation of a command such as the powering on of a system leading to annoying or incorrect operation.

On the other hand, when such a closer match is required it may become difficult to activate a desired command in a noisy environment. Furthermore, voice characteristics or habits of a particular user may be somewhat inconsistent, thereby making voice control difficult.

Accordingly, it is principal object of the invention to provide a vehicle accessory system responsive to voice commands while avoiding a falsing problem and simultaneously alleviating any difficulty in activating certain commands.

SUMMARY OF THE INVENTION

The vehicle accessory system of the present invention is responsive to voice and manual commands and includes the vehicle accessory, a microphone, voice recognition means, single button means, and controller means. The voice recognition means is coupled to the microphone for recognizing predetermined commands spoken into the microphone and generates a respective voice command signal. The single button means generates a button signal in response to a manual activation. The controller means is characterized by controller states wherein the controller means is responsive to the button signal and the voice command signal to proceed from a present state to a respective succeeding state. At least two of the controller states are responsive to the button signal, whereby the single button means performs multiple control functions.

DETAILED DESCRIPTION OF PREFERRED EMBODIMENTS

Figure 1:
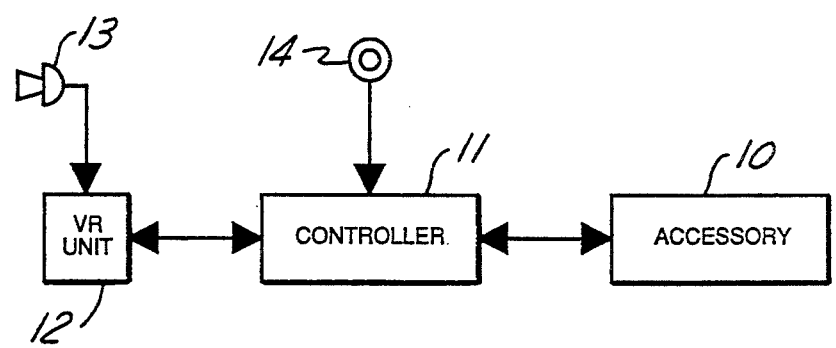
FIG. 1 is a block diagram showing a vehicle accessory system according to the present invention.

As shown in FIG. 1, an accessory system 10 has an associated electronic controller 11. Controller 11 is responsive to voice commands via a voice recognition (VR) unit 12 and a microphone 13. Upon recognition by VR unit 12 of an utterance corresponding to a predetermined command, a respective voice command signal identifying the recognized command is provided to controller 11. Controller 11 is also responsive to a button signal from a single button 14, preferably comprised of a normally open pushbutton switch. The function performed by controller 11 in response to a button signal is dependent upon the particular state of the controller when the button signal is received. Preferably, the functions accessed by manual activation of single button 14 include activation and deactivation of accessory 10 in order to overcome the more rigorous matching requirements in VR unit 12 associated with activation and deactivation of accessory 10 to avoid falsing.

The operation of controller 11 includes a plurality of controller states which correspond to the particular state or action being taken by accessory 10. For example, a cellular phone accessory may preferably include states corresponding to a powered-on "wait" state, an initiate phone call state, an answer phone call state, an end call state, a program memory state, and a turn off phone state. An audio entertainment system may include states corresponding to a turn on radio state; a tune radio frequency state; states to adjust volume, tone, balance, and fade; and other states to control cassette tape or CD functions. A climate control accessory may include states for controlling fan speed and adjusting heating, cooling and defrosting functions. A vehicle lighting system may include states for turning headlights on, switching between high and low beam, turning on and off interior lights, and dimming interior lights.

Figure 2:
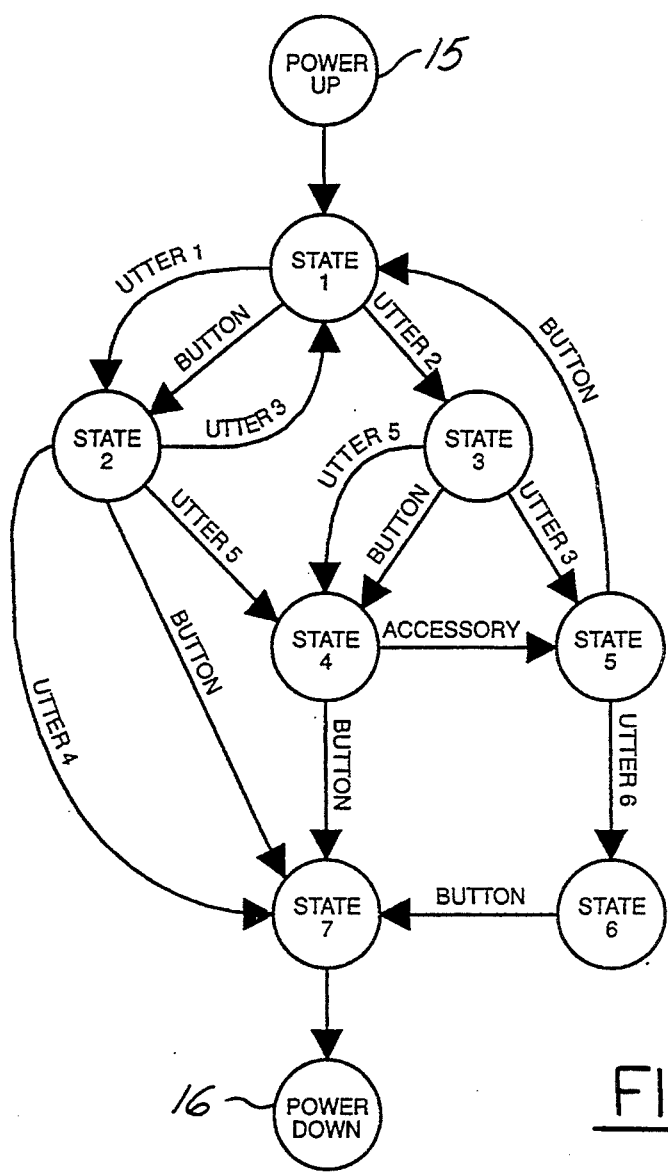
FIG. 2 is a state diagram corresponding to the controller of FIG. 1.

Control systems can be represented by a state diagram model, as is known in the art. FIG. 2 is a representative state diagram for a generic controller including seven distinct states labeled State 1 through State 7. Initially, a power-up condition 15 results when power is applied to the accessory system, such as by the turning of an ignition key in a vehicle. The controller automatically assumes State 1, which may preferably be a "ready" or a "wait" state. The accessory system may be activated from State 1 by either spoken commands or by activation of the single button. Thus, the controller progresses from State 1 to State 2 in response to recognition of a predetermined spoken command, represented in FIG. 2 as UTTER1. Furthermore, the controller is responsive in State 1 to the button signal to progress to State 2. Therefore, if the voice recognition unit requires a closer match in order to detect UTTER1 in order to avoid falsing, the system user can bypass the requirement for a close match by depressing the single button. State 1 is further responsive to another predetermined spoken command UTTER2 for progressing to State 3. In another aspect of the invention, where a plurality of states may be accessed from State 1 (e.g., State 2 or State 3), then State 1 is responsive to the button signal to proceed to the succeeding state or function most likely to be executed from State 1 (which is State 2 in this example). Thus, the ergonomic quality of the controller of the invention is further improved.

State 2 is responsive to various utterances recognized by the VR unit such that UTTER3 leads back to State 1, UTTER4 leads to State 7, and UTTER5 leads to State 4. State 2 is responsive to the button signal to proceed to State 7. Thus, the single button provides a different control function in State 2 from the function provided in State 1.

State 3 is responsive to UTTER3 to proceed to State 5, is responsive to UTTER5 to proceed to State 4, and is responsive to the button signal to proceed to State 4.

State 4 is responsive to the button signal to proceed to State 7 and is responsive to a control signal received from the accessory itself to proceed from State 4 to State 5. Thus, accessory 10 may provide a status signal to controller 11 which affects the state of the controller.

State 5 is responsive to UTTER6 to proceed to State 6 and is responsive to the button signal to proceed back to State 1.

State 6 is responsive to the button signal to proceed to state 7.

State 7 may correspond, for example, to deactivation of the accessory system. Deactivation of the accessory system may automatically result in a powering-down condition 16 (as shown) or may alternatively result in an automatic return to a wait state in State 1 (not shown), depending on the particular accessory being controlled.

FIG. 2 shows various combinations wherein a state may be responsive to spoken commands and/or manual activation of the single button. Thus, State 2 may be accessed from State 1 in response to either a predetermined voice command signal or the button signal. Furthermore, the effect of a manual activation of the single push button or the recognition of the particular utterance has a result that depends upon the instantaneous state of the controller.

Figure 3:
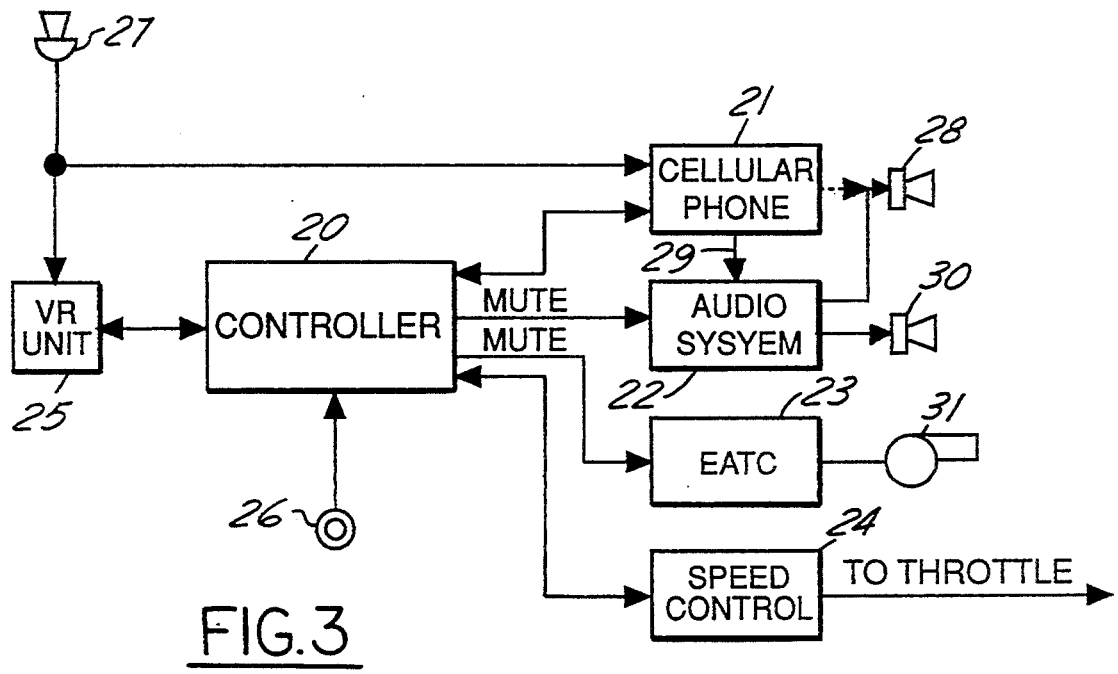
FIG. 3 is a block diagram showing a preferred embodiment of the present invention for controlling cellular telephone operation.

Turning now to FIG. 3, a specific embodiment of the present invention is shown including a controller 20 for controlling a cellular phone 21. Other accessories may also be responsive to the controller such as an audio system 22, an electronic automatic temperature control (EATC) 23, and a speed control 24. Controller 20 is connected to a VR unit 25 and a single pushbutton 26. VR unit 25 receives voice signals from a microphone 27. To reduce system components, microphone 27 is also connected to cellular phone 21 as a hands-free microphone for use during phone conversation. A hands-free cellular speaker 28 is also connected to cellular phone 21. Audio system 22 includes a speaker 30. To further improve system integration, speaker 28 may be one of the stereo speakers provided in audio system 22 with all sound through speaker 28 being amplified through audio system 22 (via interconnection 29 between cellular phone 21 and audio system 22). EATC 23 is connected to a fan motor 31 and is responsive to controller 20 to reduce the fan speed during cellular phone use and/or to adjust fan speed in accordance with voice or pushbutton commands. In response to manual activation of the pushbutton, controller 20 may provide mute signals to audio system 22 and EATC 23 to reduce noise in the vehicle during attempted recognition by VR unit 25 thereby improving the likelihood of correct recognition of voice commands.

Cellular telephone 21 may include a cellular transceiver which detects an incoming call. Thus, controller 20 is responsive to an accessory signal from cellular phone 21 identifying the incoming call.

Controller 20 may control a plurality of accessories, as shown by an additional connection to speed control 24 which is further connected to a throttle (not shown). When controlling a plurality of vehicle accessories, controller 20 may affect either total or partial control of each respective accessory. In one preferred embodiment, controller 20 has total control of cellular telephone and partial control of audio system 22 and EATC 23 as is shown in FIG. 3.

Figure 4:
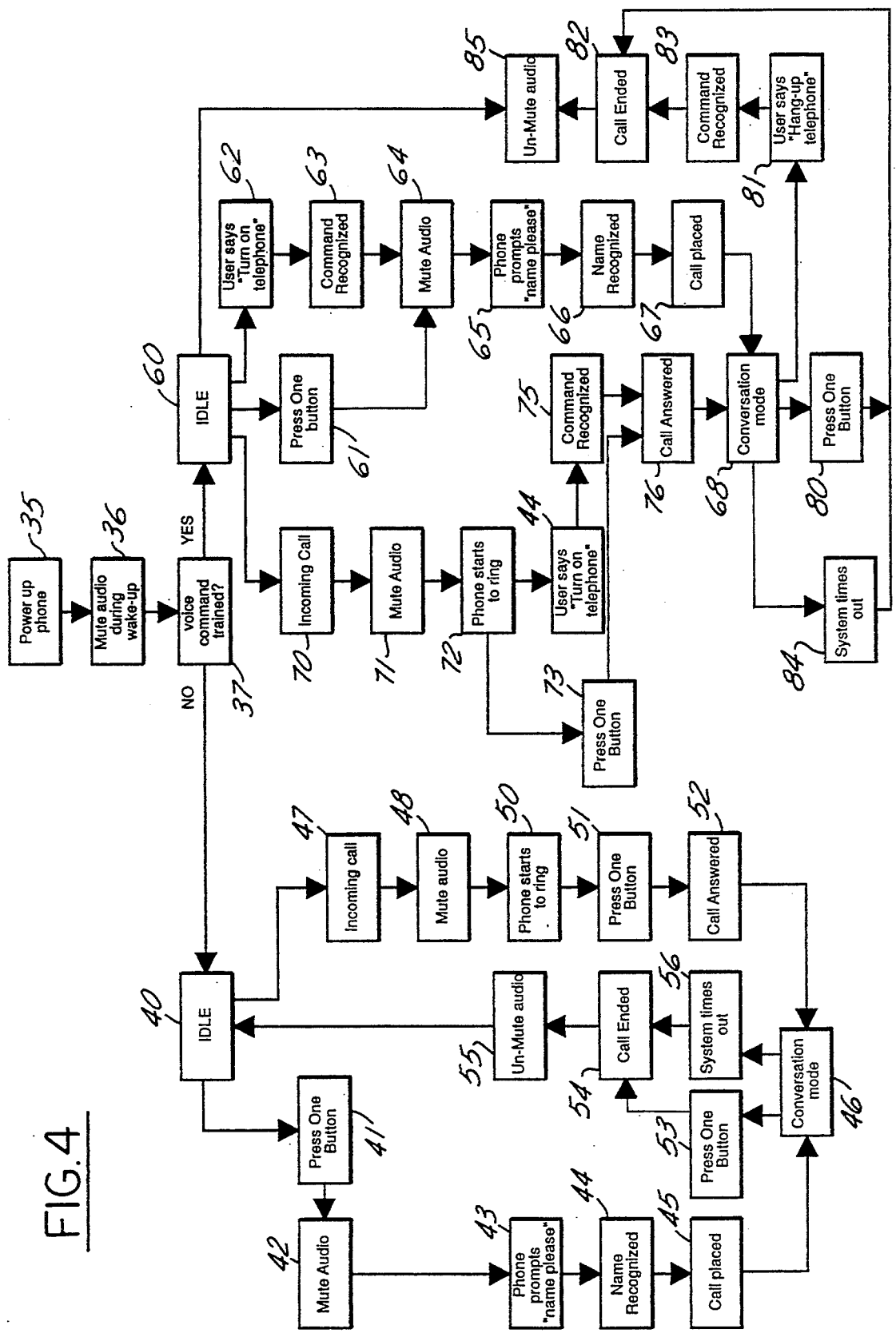
FIG. 4 is a state diagram showing operation of the controller of FIG. 3.

In the cellular phone control system corresponding to FIG. 4, the phone user has an option whether or not to preset the phone to be responsive to voice commands for activating and deactivating the phone, thereby providing a further solution to the falsing problem. Thus, if the controller is not trained to recognize an activation command, falsing is not possible. However, the activation command can be trained whereupon a closer match will be required for recognition of that command.

Power is first applied to the cellular phone system in state 35. During wake-up of the control system in state 36, the controller provides a command signal to the audio system to mute the audio output, thereby avoiding spurious signals in the audio system output during phone power-up. A check is made in state 37 for determining whether the voice activation and deactivation commands have been trained.

If voice activation and deactivation commands have not been trained, then the controller enters an idle state 40. Idle state 40 corresponds to a mode of the cellular phone wherein activation can only be obtained by manual activation of the single button. Thus, a user may decide to make a cellular phone call whereupon he will press the single button in state 41 resulting in the muting of the audio output in state 42 so that radio or tape play does not interfere with the cellular telephone call. The blower fan speed of the EATC preferably is also reduced as necessary to avoid interference. In state 43, the controller plays a phone prompt through the audio system such as "name please". The user speaks the name of a desired recipient of a phone call which is analyzed by the VR unit. Once a preprogrammed name (i.e., predetermined command) is recognized in state 44 based on an utterance analyzed by the VR unit, the controller places a call to the corresponding number stored in memory in state 45. Once the call is placed, the cellular phone enters a conversation mode in state 46.

From idle state 40, the cellular phone is responsive to incoming phone calls. When an incoming call is received in state 47, the controller mutes the output of the audio system and the EATC fan in state 48 so that only that cellular phone signals are provided on the loudspeaker. The controller plays a ringing signal through the audio system in state 50. If the user desires to answer the call, then the single button is manually activated in state 51, the call is answered in state 52, and the conversation mode is entered in state 46.

To terminate a phone call from the conversation mode, the user depresses the single button in state 53 so that the call is ended in state 54. Then the audio system is unmuted allowing a return to the playing of radio or cassette signals, for example, and the controller returns to idle state 40. If the EATC fan speed was reduced, then it is also restored to its original speed. If the cellular phone call is terminated by the other party to the call while in conversation mode 46, the cellular system will time-out the call after a predetermined time limit whereupon the controller will receive a time-out command from the cellular system in state 56. Subsequently, the call is ended in state 54 and the controller unmutes audio in state 55 and returns to idle state 40.

If the controller determines in state 37 that activation and deactivation voice commands have been trained, an idle state 60 is entered. From idle state 60, the cellular phone can be turned on either by manual activation of the single button in state 61 or by uttering the command "turn on telephone" in state 62. If either the button is pressed in state 61 or a "turn on telephone" command is recognized in state 63, the audio system is muted in state 64 and the controller prompts the user for a command in state 65, such as a request for "name please". When a valid name is recognized based on an utterance from the user in state 66, a call is placed in state 67 and the controller enters a conversation mode in state 68.

Idle state 60 is further responsive to an incoming call in state 70 whereupon the audio system is muted in state 71 and a phone ringing is played through the audio system in state 72. In response to the ringing state, the user can answer a call by either manually activating the single button in state 73 or by uttering "turn on telephone" in state 74 which is recognized in state 75 and the call is then answered in state 76.

From conversation mode 68, the user can terminate a cellular phone call by either pressing the single button in state 80 or by uttering "hang up telephone" in state 81. In response to the button depression in state 80, the phone call is ended in state 82. In response to the utterance of "hang up telephone" in state 81, the voice recognition unit recognizes the deactivation command in state 83 and the call is ended in state 82. Also, if the system times out in state 84, the controller proceeds to the call ended state in state 82. From state 82, the audio system is unmuted allowing it to resume play of radio or cassette tape signals in state 85 and a return is made to idle state 60.

Figure 5:
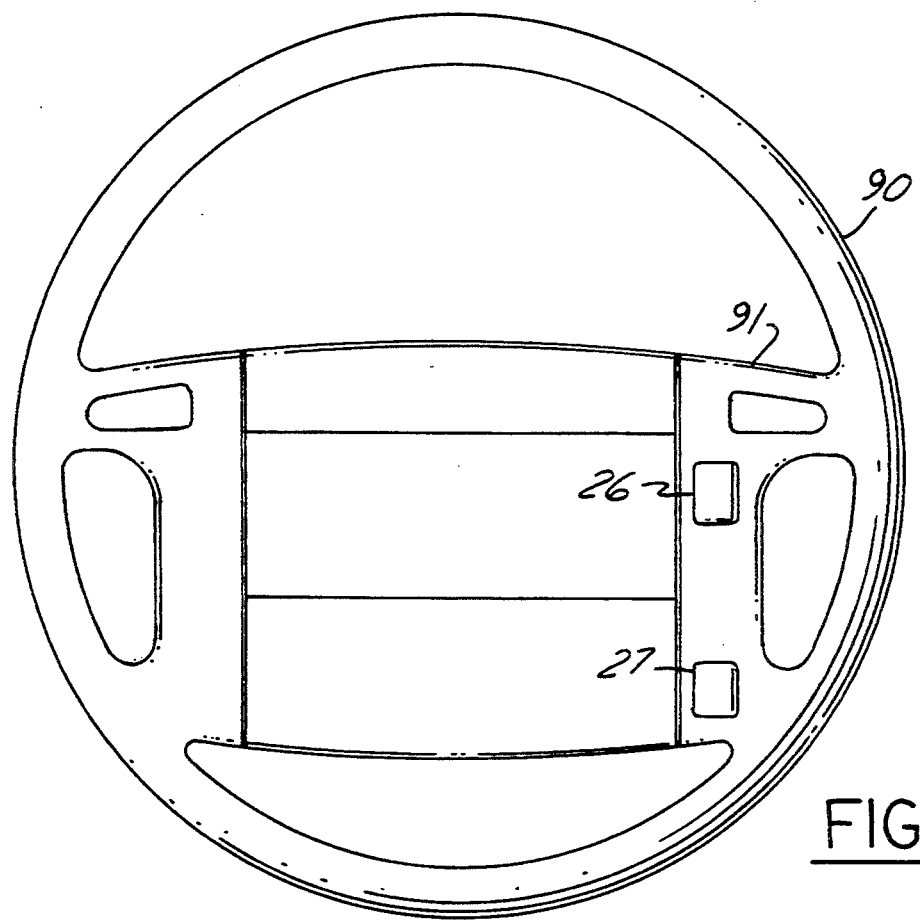
FIG. 5 shows a preferred location of the microphone and single button of the invention on a steering wheel.

FIG. 5 shows a preferred location for the microphone and single button of the invention on the steering wheel of a vehicle.

A steering wheel 90 includes a hub 91 for receiving control elements such as a single button 26 of the present invention. Likewise, steering wheel hub 91 may receive microphone 27 whereby the microphone is ideally situated near the driver for optimum pickup of his or her voice. Likewise, locating the single pushbutton of the invention on the steering wheel provides a convenient location for access by the driver.

What is claimed is:

1. A vehicle accessory system responsive to voice and manual commands, comprising:
   a vehicle accessory for performing accessory functions;
   a microphone;
   voice recognition means coupled to said microphone for recognizing predetermined commands spoken into said microphone and generating a respective voice command signal;
   manual activation means consisting of a single pushbutton for generating a manual command signal in response to a manual activation; and
   controller means coupled to said voice recognition means, said manual activation means, and said vehicle accessory for controlling said vehicle accessory, said controller means characterized by controller states wherein said controller means is responsive only to said manual command signal and said voice command signal to proceed from a present state to a respective succeeding state, at least two of said controller states being responsive to said manual command signal to activate an accessory function;
   whereby said controller means performs multiple control functions in response to said manual command signal.

2. The system of claim 1 wherein said multiple control functions include activation and deactivation of said vehicle accessory system.

3. The system of claim 1 wherein a respective function performed by said controller means in response to said manual activation signal corresponds to a function most likely to be executed from a respective present controller state.

4. The system of claim 1 wherein said controller means includes at least one state from which a predetermined succeeding state can be reached in response to either a predetermined voice command signal or said manual command signal.

5. The system of claim 1 wherein said accessory provides an accessory signal to said controller means, and wherein said controller means has at least one state responsive to said accessory signal for reaching a respective succeeding state.

6. The system of claim 1 wherein said manual activation means is adapted to be located on the steering wheel of a vehicle.

7. The system of claim 1 wherein said microphone is adapted to be located on the steering wheel of a vehicle.

8. The system of claim 1 wherein said vehicle accessory is a cellular telephone.

9. The system of claim 8 wherein said controller means is adapted to provide a mute signal to an audio system in a vehicle.

* * * * *